US012610305B2

(12) United States Patent
    Bahabri

(10) Patent No.: US 12,610,305 B2
(45) Date of Patent: Apr. 21, 2026

(54) GRADE OF SERVICE OPTIMIZATION FOR A TELECOMMUNICATIONS NETWORK

(71) Applicant: SAUDI ARABIAN OIL COMPANY, Dhahran (SA)

(72) Inventor: Mohammed Saleh Bahabri, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 610 days.

(21) Appl. No.: 18/046,246

(22) Filed: Oct. 13, 2022

(65) Prior Publication Data
    US 2024/0129832 A1      Apr. 18, 2024

(51) Int. Cl.
    *H04W 48/06*        (2009.01)
    *H04W 4/50*         (2018.01)
    (Continued)

(52) U.S. Cl.
    CPC ............. *H04W 48/06* (2013.01); *H04W 4/50* (2018.02); *H04W 16/18* (2013.01); *H04W 24/02* (2013.01); *H04W 28/00* (2013.01); *H04W 74/00* (2013.01)

(58) Field of Classification Search
    CPC ....... H04W 48/06; H04W 4/50; H04W 16/18; H04W 24/02; H04W 28/00; H04W 74/00; H04W 24/08; H04W 28/02; H04W 72/00
    See application file for complete search history.

(56) References Cited

U.S. PATENT DOCUMENTS

| 5,845,201 | A | * | 12/1998 | Funke | ................... | H04W 84/14 |
| | | | | | | 370/344 |
| 6,427,075 | B1 | * | 7/2002 | Burg | ....................... | H04W 4/02 |
| | | | | | | 455/432.1 |

(Continued)

FOREIGN PATENT DOCUMENTS

WO        WO-9310600 A1 *   5/1993   .............. H04J 3/125

OTHER PUBLICATIONS

J. Irvine, J. Pons and J. Dunlop, "Link adaptation to improve coverage in the TETRA private mobile radio system," Gateway to 21st Century Communications Village. VTC 1999-Fall. IEEE Vts 50th Vehicular Technology Conference (Cat. No.99CH36324), 1999, pp. 1091-1095 vol.2, doi: 10.1109/VETECF.1999.798604.

(Continued)

*Primary Examiner* — Brandon J Miller
(74) *Attorney, Agent, or Firm* — Vorys, Sater, Seymour and Pease LLP

(57)                    ABSTRACT

In some examples, a method can include determining a number of mobile stations that have been used by users to implement a call during a period of time using a base station of a telecommunications network based on traffic data, and determining that the number of mobile stations is equal to or within a value or range of a base station support threshold for the base station, which indicates that there is a probability that a given mobile station of mobile stations will be blocked or denied access from initiating a respective call in using the base station. The method further can include determining a number of additional channels that are needed for the base station to reduce the probability that the given mobile station of the mobile stations will be blocked or denied access from initiating the respective call in the future using the base station.

15 Claims, 10 Drawing Sheets

(51) Int. Cl.

| | |
|---|---|
| *H04W 16/18* | (2009.01) |
| *H04W 24/02* | (2009.01) |
| *H04W 28/00* | (2009.01) |
| *H04W 74/00* | (2009.01) |

(56) References Cited

U.S. PATENT DOCUMENTS

| | | | | |
|---|---|---|---|---|
| 6,628,637 | B1 * | 9/2003 | Li | H04W 52/285 |
| | | | | 370/335 |
| 6,980,517 | B1 * | 12/2005 | Qureshi | H04L 47/10 |
| | | | | 370/235 |
| 9,942,779 | B1 * | 4/2018 | Proctor | H04L 43/045 |
| 2007/0232307 | A1 * | 10/2007 | Ibrahim | H04W 36/302 |
| | | | | 455/436 |
| 2012/0142363 | A1 * | 6/2012 | Elmaleh | H04W 48/10 |
| | | | | 455/450 |
| 2013/0324103 | A1 * | 12/2013 | Ying | H04M 1/72406 |
| | | | | 455/419 |
| 2017/0223541 | A1 * | 8/2017 | Chami | H04W 48/06 |
| 2018/0176803 | A1 * | 6/2018 | Lee | H04W 24/08 |
| 2018/0253321 | A1 * | 9/2018 | Chen | G06F 3/0482 |
| 2019/0028368 | A1 * | 1/2019 | Modi | H04L 41/0816 |
| 2023/0413303 | A1 * | 12/2023 | Vivanco | H04W 72/56 |

OTHER PUBLICATIONS

Z. Kovacs, P. C. F. Eggers, K. Olesen and L. G. Petersen, "Investigations of outdoor-to-indoor mobile-to-mobile radio communication channels," Proceedings IEEE 56th Vehicular Technology Conference, 2002, pp. 430-434 vol. 1, doi: 10.1109/VETECF.2002. 1040379.

N. C. Kirkman, D. F. Bacon and J. Berry, "Analysis of a quality of service algorithm for wide-area private mobile radio systems," 2004 IEE Telecommunications Quality of Services: The Business of Success QoS 2004, 2004, pp. 171-174, doi: 10.1049/ic:20040037.

* cited by examiner

300

| A | B | C | D | E | F | G | H | I |
|---|---|---|---|---|---|---|---|---|
| Call ID | User handl | Channe | Start date | Duration | CLI Data | Direction | Phone numbe | Mark colo |
| 5128337 | | 3 | 9/1/2018 0:00 | 6 | | 0 | Works. User 5 | 0 |
| 5128338 | | 3 | 9/1/2018 0:01 | 4 | | 0 | Works. User 5 | 0 |
| 5128339 | | 3 | 9/1/2018 0:01 | 3 | | 0 | Radio User 490 | 0 |
| 5128340 | | 3 | 9/1/2018 0:01 | 4 | | 0 | Works. User 5 | 0 |
| 5128341 | | 3 | 9/1/2018 0:01 | 3 | | 0 | Radio User 490 | 0 |
| 5128342 | | 3 | 9/1/2018 0:01 | 5 | | 0 | Works. User 5 | 0 |
| 5128343 | | 3 | 9/1/2018 0:32 | 3 | | 0 | Radio User 490 | 0 |
| 5128344 | | 3 | 9/1/2018 0:45 | 3 | | 0 | Radio User 490 | 0 |
| 5128345 | | 3 | 9/1/2018 2:45 | 3 | | 0 | Radio User 490 | 0 |
| 5128346 | | 3 | 9/1/2018 4:58 | 3 | | 0 | Radio User 490 | 0 |
| 5128347 | | 3 | 9/1/2018 5:37 | 3 | | 0 | Radio User 490 | 0 |
| 5128348 | | 3 | 9/1/2018 5:37 | 3 | | 0 | Radio User 490 | 0 |
| 5128349 | | 3 | 9/1/2018 5:40 | 2 | | 0 | Radio User 490 | 0 |
| 5128350 | | 3 | 9/1/2018 5:40 | 1 | | 0 | Radio User 490 | 0 |
| 5128351 | | 3 | 9/1/2018 5:40 | 4 | | 0 | Radio User 490 | 0 |
| 5128352 | | 3 | 9/1/2018 5:41 | 2 | | 0 | Radio User 490 | 0 |
| 5128353 | | 3 | 9/1/2018 5:46 | 3 | | 0 | Radio User 490 | 0 |
| 5128354 | | 3 | 9/1/2018 6:03 | 3 | | 0 | Radio User 490 | 0 |
| 5128355 | | 3 | 9/1/2018 6:03 | 2 | | 0 | Radio User 490 | 0 |
| 5128356 | | 3 | 9/1/2018 6:03 | 1 | | 0 | Radio User 490 | 0 |
| 5128357 | | 3 | 9/1/2018 6:06 | 3 | | 0 | Radio User 490 | 0 |
| 5128358 | | 3 | 9/1/2018 6:11 | 3 | | 0 | Radio User 490 | 0 |
| 5128359 | | 3 | 9/1/2018 6:12 | 3 | | 0 | Radio User 490 | 0 |
| 5128360 | | 3 | 9/1/2018 6:12 | 3 | | 0 | Radio User 490 | 0 |
| 5128361 | | 3 | 9/1/2018 6:12 | 2 | | 0 | Radio User 490 | 0 |
| 5128362 | | 3 | 9/1/2018 6:17 | 0 | | 0 | Radio User 490 | 0 |
| 5128363 | | 3 | 9/1/2018 6:17 | 1 | | 0 | Radio User 490 | 0 |
| 5128364 | | 3 | 9/1/2018 6:17 | 1 | | 0 | Radio User 490 | 0 |
| 5128365 | | 3 | 9/1/2018 6:19 | 3 | | 0 | Works. User 5 | 0 |
| 5128366 | | 3 | 9/1/2018 6:19 | 4 | | 0 | Radio User 490 | 0 |
| 5128367 | | 3 | 9/1/2018 6:19 | 3 | | 0 | Works. User 5 | 0 |
| 5128368 | | 3 | 9/1/2018 6:19 | 3 | | 0 | Radio User 490 | 0 |
| 5128369 | | 3 | 9/1/2018 6:19 | 3 | | 0 | Works. User 5 | 0 |
| 5128370 | | 3 | 9/1/2018 6:20 | 1 | | 0 | Radio User 490 | 0 |
| 5128371 | | 3 | 9/1/2018 6:20 | 2 | | 0 | Radio User 490 | 0 |
| 5128372 | | 3 | 9/1/2018 6:20 | 10 | | 0 | Radio User 490 | 0 |

FIG. 3

| J | K | L | M | N | O | P | Q |
|---|---|---|---|---|---|---|---|
| Status | Remarks | CALL Prior | Comm. | Destination | Destination De | Destination | Destination Exch |
| 1 | \N | Normal | 1 | SSSP5 SECUR | User 5060101 | Group | 2312471 |
| 1 | \N | Normal | 1 | SSSP5 SECUR | User 5060101 | Group | 2312471 |
| 1 | \N | Normal | 1 | SSSP5 SECUR | User 5060101 | Group | 2312471 |
| 1 | \N | Normal | 1 | SSSP5 SECUR | User 5060101 | Group | 2312471 |
| 1 | \N | Normal | 1 | SSSP5 SECUR | User 5060101 | Group | 2312471 |
| 1 | \N | Normal | 1 | SSSP5 SECUR | User 5060101 | Group | 2312471 |
| 1 | \N | Normal | 1 | JD SECURITY | User 5060102 | Group | 2312471 |
| 1 | \N | Normal | 1 | MARINE | User 5060705 | Group | 2312471 |
| 1 | \N | Normal | 1 | JD SECURITY | User 5060102 | Group | 2312471 |
| 1 | \N | Normal | 1 | JTUTL | User 5060703 | Group | 2312471 |
| 1 | \N | Normal | 1 | JD SECURITY | User 5060102 | Group | 2312471 |
| 1 | \N | Normal | 1 | JD SECURITY | User 5060102 | Group | 2312471 |
| 1 | \N | Normal | 1 | JTUTL | User 5060703 | Group | 2312471 |
| 1 | \N | Normal | 1 | JTUTL | User 5060703 | Group | 2312471 |
| 1 | \N | Normal | 1 | JTUTL | User 5060703 | Group | 2312471 |
| 1 | \N | Normal | 1 | JTUTL | User 5060703 | Group | 2312471 |
| 1 | \N | Normal | 1 | JD FIRE | User 5060202 | Group | 2312471 |
| 1 | \N | Normal | 1 | JTUTL | User 5060703 | Group | 2312471 |
| 1 | \N | Normal | 1 | SSSP5 OPE | User 5060401 | Group | 2312471 |
| 1 | \N | Normal | 1 | SSSP5 OPE | User 5060401 | Group | 2312471 |
| 1 | \N | Normal | 1 | JD FIRE | User 5060202 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | JD SECURITY | User 5060102 | Group | 2312471 |
| 1 | \N | Normal | 1 | JD SECURITY | User 5060102 | Group | 2312471 |
| 1 | \N | Normal | 1 | JD SECURITY | User 5060102 | Group | 2312471 |
| 1 | \N | Normal | 1 | JD SECURITY | User 5060102 | Group | 2312471 |
| 1 | \N | Normal | 1 | JD SECURITY | User 5060102 | Group | 2312471 |
| 1 | \N | Normal | 1 | MARINE | User 5060705 | Group | 2312471 |
| 1 | \N | Normal | 1 | MARINE | User 5060705 | Group | 2312471 |
| 1 | \N | Normal | 1 | MARINE | User 5060705 | Group | 2312471 |

FIG. 3 (Cont.)

| R | S | U | V | W | X | Y |
|---|---|---|---|---|---|---|
| Destin | Destina | Destination | Destination Organiza | EADS CallType | Group Identity | Tx Party |
| | | SSSP SECURI | 3/1/2001 | 7 | 5060101 | 5201006 |
| | | SSSP SECURI | 3/1/2001 | 7 | 5060101 | 5201006 |
| | | SSSP SECURI | 3/1/2001 | 6 | 5060101 | 4901030 |
| | | SSSP SECURI | 3/1/2001 | 7 | 5060101 | 5201006 |
| | | SSSP SECURI | 3/1/2001 | 6 | 5060101 | 4901030 |
| | | SSSP SECURI | 3/1/2001 | 7 | 5060101 | 5201006 |
| | | JD SECURITY | 3/1/2002 | 6 | 5060102 | 4901145 |
| | | MARINE | 3/1/2009 | 6 | 5060705 | 4907403 |
| | | JD SECURITY | 3/1/2002 | 6 | 5060102 | 4907522 |
| | | JTUTL | 3/1/2002 | 6 | 5060703 | 4907186 |
| | | JD SECURITY | 3/1/2002 | 6 | 5060102 | 4901167 |
| | | JD SECURITY | 3/1/2002 | 6 | 5060102 | 4901189 |
| | | JTUTL | 3/3/2002 | 6 | 5060703 | 4907263 |
| | | JTUTL | 3/3/2002 | 6 | 5060703 | 4907225 |
| | | JTUTL | 3/3/2002 | 6 | 5060703 | 4907263 |
| | | JTUTL | 3/3/2002 | 6 | 5060703 | 4907225 |
| | | JD FIRE | 3/2/2003 | 6 | 5060202 | 4902159 |
| | | JTUTL | 3/3/2002 | 6 | 5060703 | 4907467 |
| | | SSSP OPE | 3/3/2003 | 6 | 5060401 | 4904051 |
| | | SSSP OPE | 3/3/2003 | 6 | 5060401 | 4904057 |
| | | JD FIRE | 3/2/2003 | 6 | 5060202 | 4902159 |
| | | MARINE | 3/3/2009 | 6 | 5060705 | 4907429 |
| | | MARINE | 3/3/2009 | 6 | 5060705 | 4907403 |
| | | MARINE | 3/3/2009 | 6 | 5060705 | 4907429 |
| | | MARINE | 3/3/2009 | 6 | 5060705 | 4907403 |
| | | MARINE | 3/3/2009 | 6 | 5060705 | 4907506 |
| | | MARINE | 3/3/2009 | 6 | 5060705 | 4907506 |
| | | MARINE | 3/3/2009 | 6 | 5060705 | 4907506 |
| | | JD SECURITY | 3/1/2002 | 7 | 5060102 | 5201002 |
| | | JD SECURITY | 3/1/2002 | 6 | 5060102 | 4901139 |
| | | JD SECURITY | 3/1/2002 | 7 | 5060102 | 5201002 |
| | | JD SECURITY | 3/1/2002 | 6 | 5060102 | 4901139 |
| | | JD SECURITY | 3/1/2002 | 7 | 5060102 | 5201002 |
| | | MARINE | 3/3/2009 | 6 | 5060705 | 4907409 |
| | | MARINE | 3/3/2009 | 6 | 5060705 | 4907429 |
| | | MARINE | 3/3/2009 | 6 | 5060705 | 4907409 |

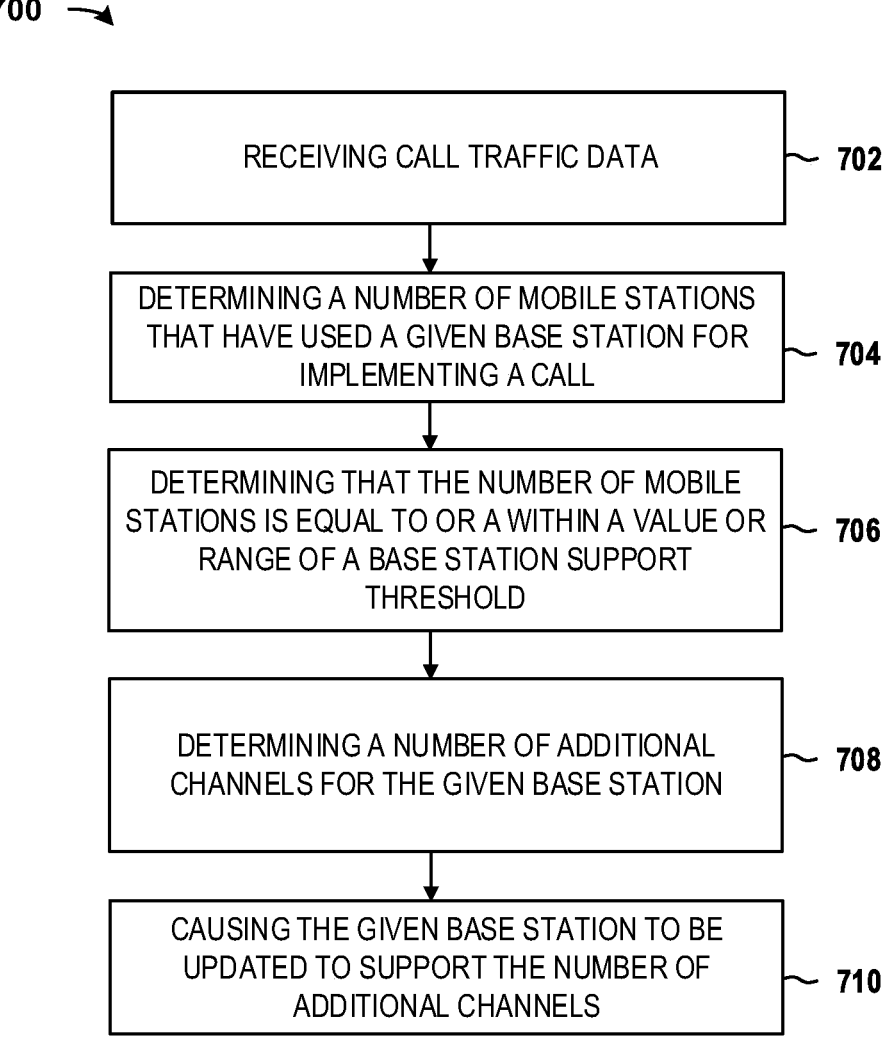

| | |
|---|---|
| RECEIVING CALL TRAFFIC DATA | 702 |
| DETERMINING A NUMBER OF MOBILE STATIONS THAT HAVE USED A GIVEN BASE STATION FOR IMPLEMENTING A CALL | 704 |
| DETERMINING THAT THE NUMBER OF MOBILE STATIONS IS EQUAL TO OR A WITHIN A VALUE OR RANGE OF A BASE STATION SUPPORT THRESHOLD | 706 |
| DETERMINING A NUMBER OF ADDITIONAL CHANNELS FOR THE GIVEN BASE STATION | 708 |
| CAUSING THE GIVEN BASE STATION TO BE UPDATED TO SUPPORT THE NUMBER OF ADDITIONAL CHANNELS | 710 |

FIG. 7

GRADE OF SERVICE OPTIMIZATION FOR A TELECOMMUNICATIONS NETWORK

FIELD OF THE DISCLOSURE

This disclosure relates generally to telecommunications networks, and more particularly, to optimizing a grade of service (GOS) of a telecommunications network.

BACKGROUND OF THE DISCLOSURE

In telecommunications, trunking is a technology for providing network access to multiple clients simultaneously by sharing a set of circuits, carriers, channels, or frequencies, instead of providing individual circuits or channels for each client. This is analogous to a structure of a tree with one trunk and many branches. Trunking in telecommunication originated in telegraphy, and later in telephone systems where a trunk line is a communications channel between telephone exchanges.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a computer-implemented method can include receiving call traffic data from a recorder system coupled to a telecommunications network, determining a number of mobile stations that have been used by users to implement a call during a period of time using a base station of the telecommunications network based on the traffic data, and determining that the number of mobile stations is equal to or within a value or range of a base station support threshold corresponding to a probability that a given mobile station of mobile stations of the number of mobile stations will be blocked or denied access from initiating a respective call using the base station. The computer-implemented method can further include determining a number of additional channels that are needed for the base station to reduce the probability that the given mobile station of the mobile stations will be blocked or denied access from initiating the respective call using the base station. The second probability can be lower than the first probability.

In another embodiment, a system can include memory to store machine-readable instructions and data comprising call traffic data, and one or more processors to access the memory and execute the machine-readable instructions. The machine-readable instructions can include a GOS engine programmed to determine that there is a probability that a given mobile station of mobile stations using a base station of a communication network will be blocked or denied access from initiating a respective call using the base station based on the call traffic data, determine a number of additional channels that are needed for the given base station to reduce the probability that the given mobile station of the mobile stations will be blocked or denied access from initiating the respective call using the base station, and identify a number of additional hardware and/or a type of additional hardware needed for implementation at the base station to support the number of additional channels corresponding to reducing the probability that the given mobile station of the mobile stations will be blocked or denied access from initiating the respective call using the base station.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 is an example of call traffic data.

FIG. 7 is an example of a method for optimizing a GOS of a trunked telecommunications network.

DETAILED DESCRIPTION

Figure 1:
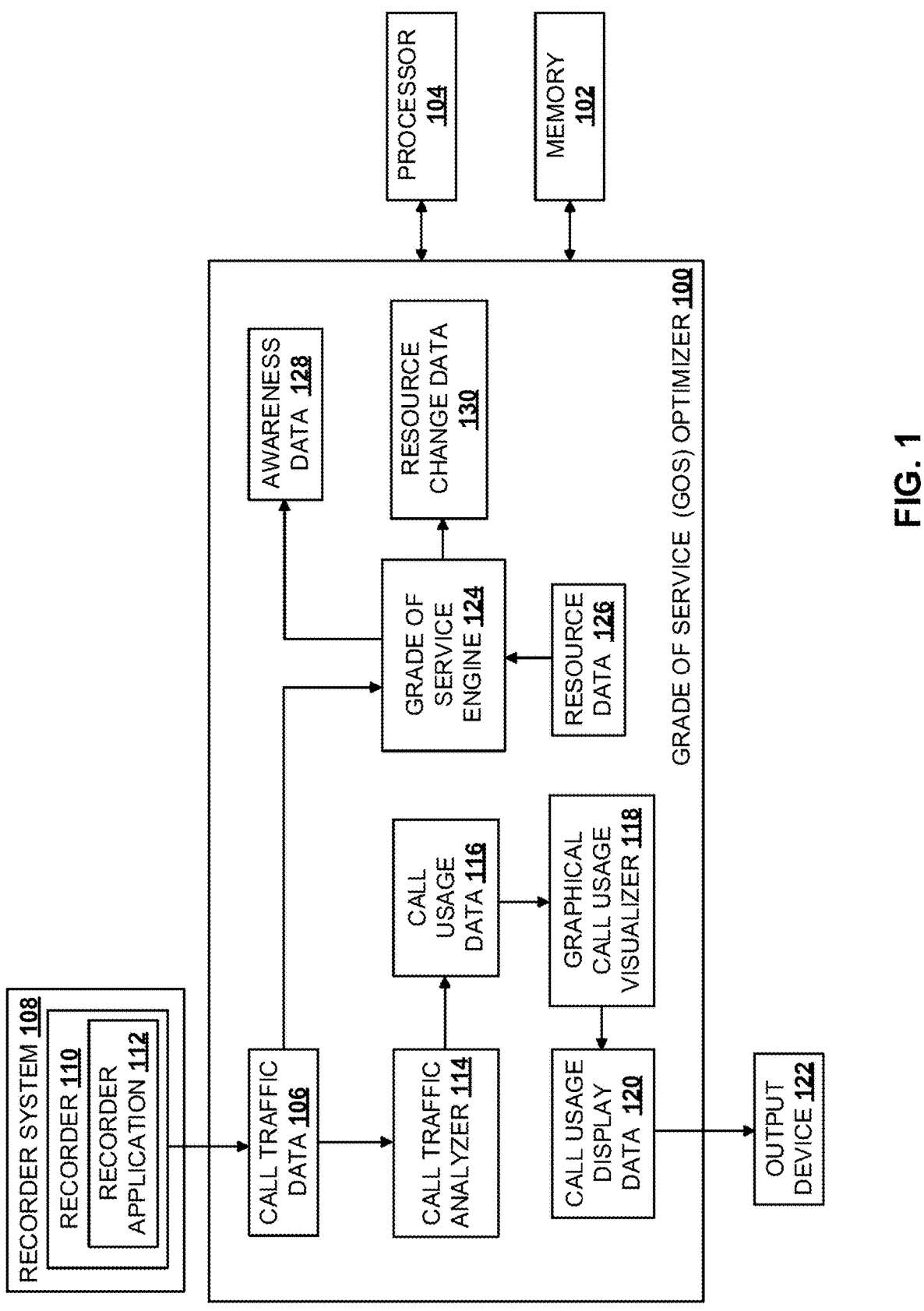
FIG. 1 is an example of a GOS optimizer.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to GOS optimization of a trunked telecommunications network. A GOS optimizer is described herein for improving a user's ability to access a trunked telecommunications network, for example, during peak network use (e.g., busiest hour, such as during a particular week, month, and/or year). According to the examples herein, the GOS optimizer can analyze call traffic data (e.g., radio traffic data) and optimize the trunked telecommunications network to meet call demands. For example, the GOS optimizer can determine that additional base station channel hardware is needed to reduce a probability that a particular mobile station will be blocked or denied access to the trunked telecommunications network. In some examples, the GOS optimizer can identify one or more additional base station channel cards or transmit/receive channel cards.

FIG. 1 is a block diagram of a system using a grade of service (GOS) optimizer 100 in accordance with certain embodiments. Grade of service is used to define a desired performance for a trunked telecommunications network by specifying a desired likelihood of a mobile station securing channel access given a number of channels available in the trunked telecommunications network. Thus, the GOS can be representative of a probability that a call is blocked or delayed by a base station of the trunked telecommunications network. The GOS optimizer 100 can be implemented using one or more modules, shown in block form in the drawings. The one or more modules can be in software or hardware form, or a combination thereof. In some examples, the GOS optimizer 100 can be implemented as machine readable instructions that can be stored in a memory 102, as shown in FIG. 1. A processor 104 can access a memory 102 and execute machine readable instructions stored therein to implement at least some of the functions, as described herein. By way of example, the memory 102 can be implemented, for example, as a non-transitory computer storage medium, such as volatile memory (e.g., random access memory (RAM), such as DRAM), non-volatile memory (e.g., a hard disk drive, a solid-state drive, a flash memory, or the like), or a combination thereof. The processor 104 can be implemented, for example, as one or more processor cores.

Figure 2:
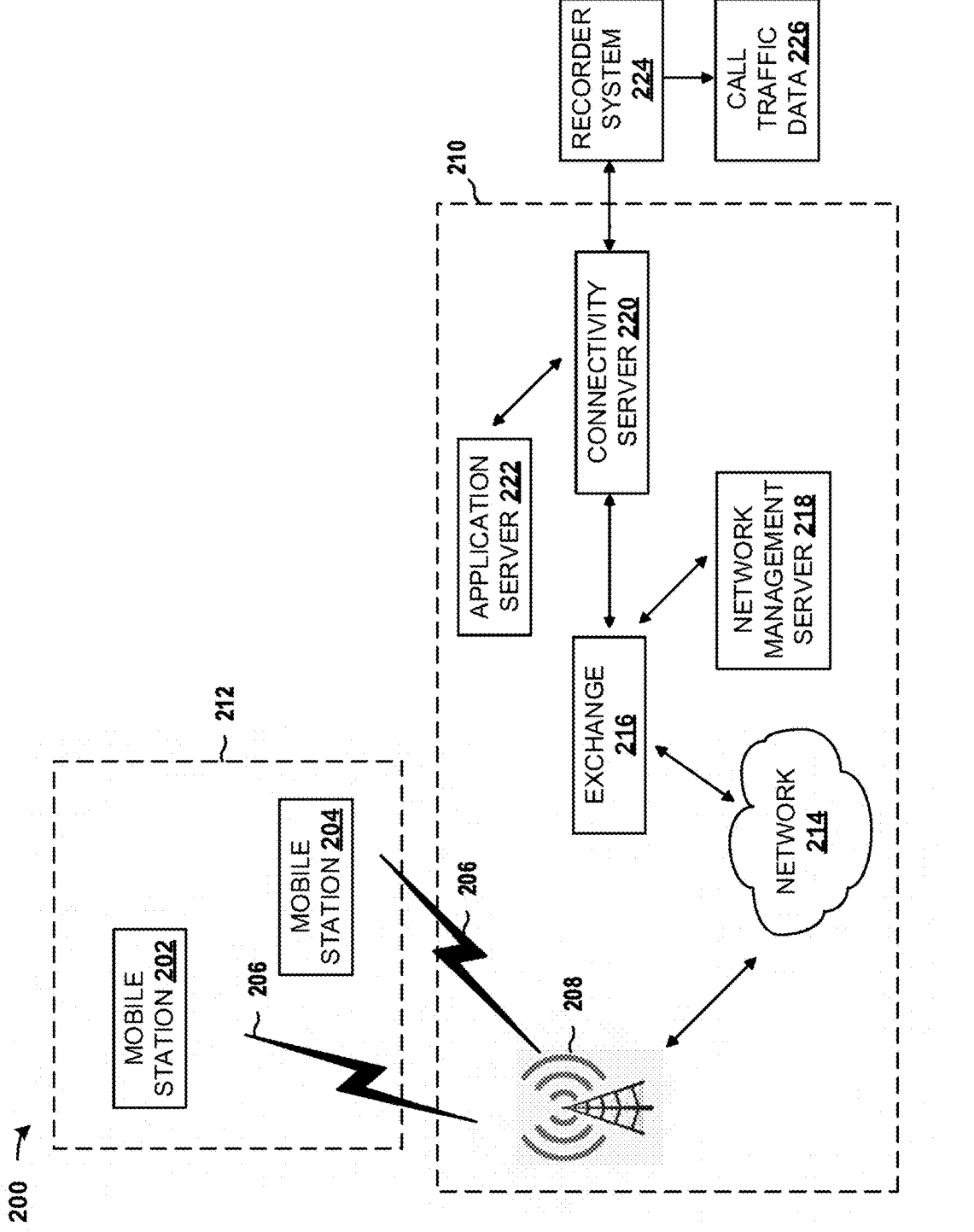
FIG. 2 is an example of a trunked telecommunications network.

The GOS optimizer 100 can receive call traffic data 106 from a recorder system 108. The recorder system 108 can be coupled to the trunked telecommunications network (e.g., a trunked telecommunications network 200, as shown in FIG. 2) to log, capture or record calls. For example, the recorder system 108 can support the recording of group calls, private calls, telephone interconnect calls occurring on the trunked telecommunications network, and/or capturing of other related call and communication network information. The recorder system 108 can include a recorder 110 to capture or log calls on the trunked telecommunications network. In some examples, the recorder 110 can be implemented as a recorder server.

A recorder application 112 can be executed on the recorder 110 for recording communication data, referred to as call data, for each call to provide the call traffic data 106. The call data can include call information characterizing one or more calls, network information, exchange information, base station information, and mobile station user information or attribute information. The call traffic data 106 can have a comma-separated values (CSV) file format, or in other examples a different file format. For example, the recorder application 112 can extract relevant call information from the call data to provide the call traffic data 106. In some examples, the call traffic data 106 can be referred to as a call usage traffic report. The call traffic data 106 can for example be in the form of a table having rows that can be representative of radio call events. Columns in the table can be representative of radio/user attributes. The radio/user attributes can include, for example, a start time, a duration, a processing customer talk group, a processing base station, a processing radio switch, a group subscriber system identity, an individual subscriber system identity, a physical asset number, etc.

The GOS optimizer 100 can include a call traffic analyzer 114, which can process the call traffic data 106 to determine call usage according to base stations, groups, and/or subscribers corresponding to call usage data 116 in the example of FIG. 1. For example, the call traffic analyzer 114 can perform call traffic analysis using a data mining process for table row data of the call traffic data 106 to provide the call usage data 116. In some examples, the GOS optimizer 100 includes a graphical call usage visualizer 118 that can output call usage display data 120 based on the call usage data 116. The call usage display data 120 can be rendered on an output device 122 (e.g., a display, a monitor, printer, projector, or other type of displaying device) to enable or allow a user to visualize graphically call usage for different base stations, groups, and/or subscribers. In some examples, a user can employ the call usage display data 120 to optimize the GOS of the trunked telecommunications network.

In some examples, the GOS optimizer 100 includes a GOS engine 124 for optimizing the GOS of the trunked telecommunications network based on the call traffic data 106 and/or resource data 126. The resource data 126 can identify a number of mobile stations for (e.g., assigned or associated with) a group. A group or subscriber as used herein can refer to a set of one or more mobile stations and/or users associated with the mobile stations. In some instances, the resource data 126 can identify a number of channels (e.g., radio-frequency (RF) channels), or channel hardware (e.g., circuits) for one or more base stations of the trunked telecommunications network, which can be indicative of maximum number of calls that can be supported by a respective base station. Each channel of a given base station can be occupied (e.g., accessed) by one or more mobile stations, and thus a maximum number of mobile stations that the given base station can support can be referred to herein as a base station support threshold. As such, the base station support threshold can represent a maximum number of mobile stations or calls that can be supported by the given base station, such that all channels of the base station are in use. Thus, if a respective mobile station requests service from the base station and all of the channels are already fully in use, the respective mobile station will be blocked, or denied access by the base station from initiating, implementing, or receiving a call.

In some examples, the GOS engine 124 can determine a number of mobile stations that have been previously in use by users of one or more groups based on the call traffic data 106. The number of mobile stations determined by the GOS engine 124 to have been previously in use by the users based on the call traffic data 106 can be referred to as in-use mobile stations. The GOS engine 124 can determine that the number of in-use mobile stations is equal to or below a predetermined mobile station use threshold. Such a determination can indicate that there is a lack of knowledge on how to use mobile stations, for example, by the users of the one or more groups. The GOS engine 124 can output awareness data 128 indicating that there is a lack of knowledge on how to use mobile stations by the users of the one or more groups. In some examples, the awareness data 128 can identify the in-use mobile stations or users of the in-use mobile stations that are not using respective mobile stations, which can be inferred as these users not knowing how to use respective mobile stations. In additional or alternative examples, the awareness data 128 can be provided to a group manager (e.g., of a group) to alert same or to another system or module that there is a lack of knowledge on how to use respective mobile stations by the users of the group. Thus, the group manager can train one or more users of the group on how to use the respective mobile stations. The GOS engine 124 can continuously or periodically alert or notify the group manager about the lack of knowledge on how to use the respective mobile stations until the number of in-use mobile stations for a given group is greater than or equal to the predetermined mobile station use threshold.

In some instances, the GOS engine 124 receives historical resource usage data that indicates a number of mobile stations that had been previously used by users of a given group (or other groups) for a period of time (e.g., a number of months, days, or years). The resource data 126 can include the historical resource usage data. The GOS engine 124 can compute an average number of mobile stations that have been used by users of the given group over the period of time based on the resource data 126. Using the average number of mobile stations, the GOS engine 124 can identify a subset of in-use mobile stations of in-use mobile stations that can be made available for use by another group. The other group can use a different or the same base station for calls as the given group. For example, the GOS engine 124 can compute a difference between the number of in-use mobile stations and the average number of mobile stations. The difference can correspond to the subset of in-use mobile stations. In some examples, the GOS engine 124 can determine that the number of in-use mobile stations for the given group is greater than the predetermined mobile station use threshold and identify the subset of in-use mobile stations of the in-use mobile stations in a same or similar manner as described herein.

The GOS engine 124 can output resource change data 130 identifying the subset of in-use mobile stations. A user can coordinate for removal of the subset of in-use mobile stations from a pool of in-use mobile stations for the users for the given group based on the resource change data 130. In some instances, the user may remove only a select few of the subset of in-use mobile stations such that the users of the given group can use remaining in-use mobile stations as spare mobile stations. In some examples, the GOS engine 124 can cause the subset of in-use mobile stations from being able to access or use the base station to request service. Because the subset of in-use mobile stations are no longer using the base station to request service (e.g., in response to being removed and/or disabled from using the base station) radio traffic congestion for the trunked telecommunications network can be reduced. As such, there can be a lower probability for a respective in-use mobile station to be blocked or denied access to the base station and thus the trunked telecommunications network.

In some examples, the GOS engine 124 can process the call traffic data 106 to determine whether there is a high utilization of the in-use mobile stations on the trunked telecommunications network. For example, the GOS engine 124 can determine there is a high utilization of the in-use mobile stations by determining a number of times that the in-use mobile stations (or select in-use mobile stations) are used to request service from one or more base stations over a period of time based on the call traffic data 106. If the number of times that the in-use mobile station (or select in-use mobile stations) are used to request service over the period of time is greater than a service request frequency threshold, this can indicate that usage of the in-use mobile stations is high. High usage of the in-use mobile stations can be indicative of a need for additional or spare batteries for the in-use mobile stations.

The GOS engine 124 can output the awareness data 128 identifying a number of additional or spare batteries that should be maintained by one or more users for the in-use mobile stations. For example, the GOS engine 124 can determine a length of one or more calls (e.g., in seconds) by one or more in-use mobile stations and use the determined call length and a battery draining table to determine the number of additional or spare batteries that are needed for the in-use mobile stations. The battery draining table can indicate an amount battery drain for a number of call seconds. In additional or alternative examples, the awareness data 128 can be provided to the group manager to alert same of a need to maintain additional or spare batteries at a favorable location (e.g., near a base station) for the in-use mobile stations.

In some examples, if the number of in-use mobile stations being used for calling using the given base station is equal to or within a value or range (e.g., 2-3 integers) of the base station support threshold for the given base station, this can indicate that radio traffic is high for the given base station (e.g., during a given period of time, such as peak time). Because radio traffic is high for the given base station, there is a greater probability that one or more additional or existing in-use mobile stations will be blocked or denied access to the trunked telecommunications network via the given base station. The GOS engine 124 can output the resource change data 130 indicating that communication channel resources of the given base station need updating (e.g., upgrading) to support a greater number of channels so that the one or more additional or existing in-use mobile stations can use the given base station to initiate a call at a future time. In some examples, the resource change data 130 can indicate a number of additional channels required at the given base station to support the additional or existing in-use mobile stations without denial of service. Thus, in some instances, the GOS engine 124 can determine the number of additional channels resources (e.g., circuits) that can be needed for the given base station to support the one or more additional or existing in-use base stations. In a further example, the resource change data 130 can include a bill of material (BOM) identifying the base station channel hardware needed for upgrading the given base station so that the base station can be configured for supporting the one or more additional or existing in-use base stations Upgrading the given base station (e.g., base station channel hardware) to support a greater number of channels improves the GOS of the base station as the probability that the one or more additional or existing in-use mobile stations will be blocked or denied access to the trunked telecommunications network can be reduced. In safety-critical scenarios, high levels of GOS are desired to ensure that a user can secure base station access (e.g., initiate a call) as denial or delaying a response for an incoming call can jeopardize systems, machinery, and/or lives. The ability of GOS engine 124 to determine that additional channels are needed for the given base station based on the call traffic data 106 improves the probability that the one or more additional in-use mobile stations will not be blocked or denied access to the trunked telecommunications network. Thus, the GOS engine 124 can be used to reduce or prevent injury to machinery, system, and/or users, and improve overall safety and business operations. The GOS engine 124 can continuously evaluate the call traffic data 106 to determine whether additional channels may be needed for the given base station to accommodate greater call traffic.

In some examples, the GOS engine 124 can process the call traffic data 106 to identify in-use mobile stations that are non-active mobile stations. For example, the call traffic data 106 can include a mobile station identifier to identify each in-use mobile station. The resource data 126 can include the mobile station identifier for each historical in-use mobile station. The number of in-use mobile stations identified by the historical resource usage data for a given period of time can be referred to as a number of historical in-use mobile stations.

The GOS engine 124 can evaluate the mobile station identifiers from the call traffic data 106 and the mobile station identifiers from the resource data 126 to identify mobile station identifiers from the call traffic data 106 that have no matching counterpart in the resource data 126, or vice versa. The mobile station identifiers of the call traffic data 106 for the in-use mobile stations that have no matching counterpart in the resource data 126 can be referred to as the non-active mobile stations. Thus, the GOS engine 124 can identify which in-use mobile stations have not been utilized for a specified time frame and thus pose a security risk to an organization as such mobile stations can fall into the hands of an unauthorized user. In-use mobile stations that are not used by users of the organization pose a security risk as an intruder or an unwanted party can use such mobile stations to infiltrate and compromise an organization. By identifying the non-active mobile stations from the in-use mobile stations based on the call traffic data 106 and the resource data 126, the GOS engine 124 can improve an organization's security and mitigate threats (e.g., cybersecurity threats) that intruders pose to such organizations. In some examples, the GOS engine 124 can disable the non-active mobile stations such that the non-active mobile stations cannot request service and thus access the trunked telecommunications network.

In some examples, the GOS engine 124 can output the awareness data 128 identifying the non-active mobile stations and/or users of the non-active mobile stations in response to identifying the non-active mobile stations. The awareness data 128 can be used to reassign or reallocate the non-active mobile stations to other groups and/or subscribers that may have a need for additional mobile stations. Thus, the GOS engine 124 can track mobile stations for users of one or more groups and identify inactive mobile stations to mitigate or reduce threats to an organization.

Accordingly, the GOS optimizer 100 can optimize the GOS of the trunked telecommunications network to meet user call demands based on the call traffic data 106 for such a network. The GOS optimizer 100 can determine that additional base station channel hardware or processing or other resources are needed to reduce the probability that the one or more additional mobile stations will be blocked or denied access to the trunked telecommunications network. The GOS optimizer 100 can ensure radio system reliability, readiness, and capability to execute and process group and/or subscriber radio traffic. Moreover, the GOS optimizer 100 can provide graphical visualizations and thus highlight call traffic volume for the trunked telecommunications network resources so that operators can readily assess and mitigate issues. The GOS optimizer 100 can monitor the radio traffic via the call traffic data 106 and ensure that radio service demand can be continuously optimized. Additionally, the GOS optimizer 100 can identify non-active mobile stations to mitigate or reduce security threats that such unmonitored or unused devices can pose to an organization.

FIG. 2 is an example of a simplified system architecture of a trunked telecommunications network 200 in accordance with certain embodiments. As shown in the example of FIG. 2, a plurality of mobile stations 202-204 can have a communication link 206 (e.g., an air interface link) with a base station 208 (e.g., a base station transceiver station) of the trunked telecommunications network 200. For clarity and brevity purposes, the example of FIG. 2 shows a single base station, however, it is to be understood, that the trunked telecommunications network 200 can include any number of base stations that can serve a number of mobile stations. In some examples, the trunked telecommunications network 200 includes an infrastructure 210. The infrastructure 210 can be accessed by the mobile stations 202-204, which can be members of a group 212, as shown in FIG. 2. In some examples, the group 212 can be referred to as a subscriber.

In examples wherein the trunked telecommunications network 200 is a Terrestrial Trunked Radio (TETRA) network, the infrastructure 210 can be a switching and management infrastructure (SwMI). The TETRA standard provides both a trunked mode (TMO) for network based connections, and a direct mode (DMO) for device-to-device connections, which can be used outside a network coverage area (e.g., outside the trunked telecommunications network 200). For instance, the mobile station 202 being used by a user in a rescue operation could be unable to establish a link with the base station 208 in TMO, but could be able to establish a device-to-device DMO link with another TETRA enabled device, such as the mobile station 204, at a nearby but safer location. In some examples, the mobile stations 202-204 are used by an organization. For example, the mobile stations 202-204 can be used to support business operations and safety in several sectors or industries, such as industrial security, fire, exploration, terminal, distribution, drilling, emergencies, medical, and in other types of sectors or industries.

The mobile stations 202-204 can include narrowband communication devices and/or broadband communication devices. Examples of narrowband communication device can include access terminals, mobile radios, portable radios, mobile stations, wireless communications devices, user equipment, mobile devices, or any other narrowband communication device capable of operating in a wireless environment or any wired devices such a dispatch console. Examples of trunked telecommunications networks 200 can include the Association of Public-Safety Communications Officials (APCO) Project 25 (P25) Phase I, APCO P25 Phase II, TETRA, integrated Digital Enhanced Network (iDEN), and/or a Digital Mobile Radio (DMR). In some examples, the trunked telecommunications network 200 includes Institute of Electrical and Electronics Engineers (IEEE) standards for wireless networking such as 802.11 and 802.16, and other wireless technologies, such as evolution data optimized (EVDO), universal mobile telecommunications service (UMTS), high speed packet access (HSPA), and/or long term evolution (LTE) wireless technologies, fifth and/or sixth generation technology standards.

The base station 208 can support an N number of channels, wherein N is an integer value greater than or equal to one (1). For example, each channel can be occupied by one or more connections between a respective one of the mobile stations 202-204, typically referred to as a caller, and a destination device or node, typically referred to as a called party, or a destination node. In some examples, the mobile stations 202 or 204 is the called party. Typically, such a connection is an individual call or a group call. In some examples, a respective call can be initiated by one of the mobile stations 202-204, while in other examples, the respective call can be initiated by a different device or system.

For example, to initiate a call, a respective mobile station 202 or 204 sends a service request (or call imitation request) to the base station 208. If a respective channel of the N number of channels is available to support the call, the base station 208 allocates the respective channel for the respective mobile station 202 or 204 in response to the service request. In response to the respective channel being allocated (e.g., provided access), the call can be established. Thus, each mobile station 202 and 204 can be allocated one of the channels of the base station 208 on a per call basis, and upon termination of the call, a previously occupied channel can be returned to a pool of available channels of the base station 208. In some examples, if all of the channels of the base station 208 are in use (e.g., occupied by calls), the respective mobile station 202 or 204 will be blocked or denied access by the base station 208.

The base station 208 can communicate via a network 214 with a digital exchange (DXT) 216. The network 214 can include wired and/or wireless connections. A wireless connection can be implemented with a wireless transceiver operating according to TETRA, LTE (Long Term Evolution), GSM (Global System for Mobile Communications), WCDMA (Wideband Code Division Multiple Access), WLAN (Wireless Local Area Network), WiMAX (Worldwide Interoperability for Microwave Access) or Bluetooth® standard, or any other suitable standard/non-standard wireless communication means. A wired connection can be implemented for example using Asynchronous Transfer mode (ATM), or Ethernet.

In some examples, the DXT 216 is a switch. The DXT 216 can include hardware and/or software that enable subscriber lines, telecommunication circuits and/or other functional units to be interconnected for users. A switch may also include the function of the router. Accordingly, the switch can be configured to route Internet Protocol (IP) packets. In some examples, the infrastructure 210 includes a network management server 218. The network management server 218 can be used for supervision and management of the DXT 216, and in some instances remote monitoring of network elements. In some examples, the infrastructure 210 includes a connectivity server 220. Connections between the DXT 216, the network management server 218, and the connectivity server 220 in the infrastructure 210 may employ the same technologies as the network 214, or different connections. The connectivity server 220 can be employed to integrate or interface applications into the infrastructure 210. For example, the connectivity server 220 can be used to interface an application server 222 into the infrastructure 210. The application server 222 can include service logic for providing one or more services in the trunked telecommunications network 200. The application server 222, in some examples, can provide storage for application specific data. Accordingly, the application server 222 can host applications that provide the one or more services.

In some examples, the connectivity server 220 can interface with a recorder system 224. While the example of FIG. 1 illustrates the recorder system 224 as separate from the application server 222, in some applications, the application server 222 includes in the recorder system 224. The recorder system 224 can correspond to the recorder system 108, as shown in FIG. 1. Thus, reference can be made to the example of FIG. 1 in the example of FIG. 2. The recorder system 224 can access the DXT 216 to capture call data on the trunked telecommunications network 100, for example, between the mobile stations 202-204, other mobile stations, and other destination devices, system, and/or nodes. The call traffic data 226 can include call information characterizing one or more calls, network information, exchange information, base station information, and mobile station user information or attribute information. The recorder application 112 can process the captured call data to provide the call traffic data 226, as shown in FIG. 2. The call traffic data 226 can correspond to the call traffic data 106, as shown in FIG. 1. While the example of FIG. 2 shows the recorder system 224 as separate from the infrastructure 210, in some examples, the infrastructure 210 can include the recorder system 224.

As described herein, the call traffic data 226 can be processed by the GOS optimizer 100 according to the examples herein for optimizing a GOS of a given base station, such as the base station 208, as shown in FIG. 1, to meet network traffic demands, for example, for the given group 212. In some examples, referred to herein as "a given example," the base station 208 can have a fixed number of channels that can support a given number of mobile stations, which can be less than a number of mobile stations 202-204 of the group 212. Because, in the given example the base station 208 cannot support all of the mobile stations 202-204, a respective mobile station of the mobile stations 202-204 (or one or more additional mobile stations) will be denied or blocked from implementing a call using the base station 208. In some examples, the respective mobile station is a new mobile station, which may be part of the group 212 or a different group, or no group at all.

The GOS engine 124 of the GOS optimizer 100 as described herein in the given example can determine that the base station 208 cannot support the respective mobile station based on the call traffic data 226. The GOS engine 124 can determine or identify a number of additional channels that can be needed for the base station 208 to support implementing, initiating, or receiving a call by the respective mobile station. The GOS engine 124 can cause the base station 208 to be updated with hardware (e.g., call circuits, and/or other hardware to instantiate channel hardware support, or possibly other processing configurations) to provision additional channels so that the respective mobile device can use the base station to implement or receive a call, and thus not be denied or blocked from implementing or receiving the call using the base station 208. For example, the GOS engine 124 can output the resource change data 130 (FIG. 1) identifying a number of additional hardware and/or a type of additional hardware or resources needed to support the respective mobile station on the base station 208.

FIG. 3 is an example of call traffic data 300 in CSV format with rows and columns that are usable in the analysis discussed above. The call traffic data 300 can be provided by the recorder system 108, as shown in FIG. 1, or the recorder system 224, as shown in FIG. 2. Thus, reference can be made to the example of FIGS. 1-2 in the example of FIG. 3. In some instances, the call traffic data 300 corresponds to the call traffic data 106, as shown in FIG. 1.

Figure 4:
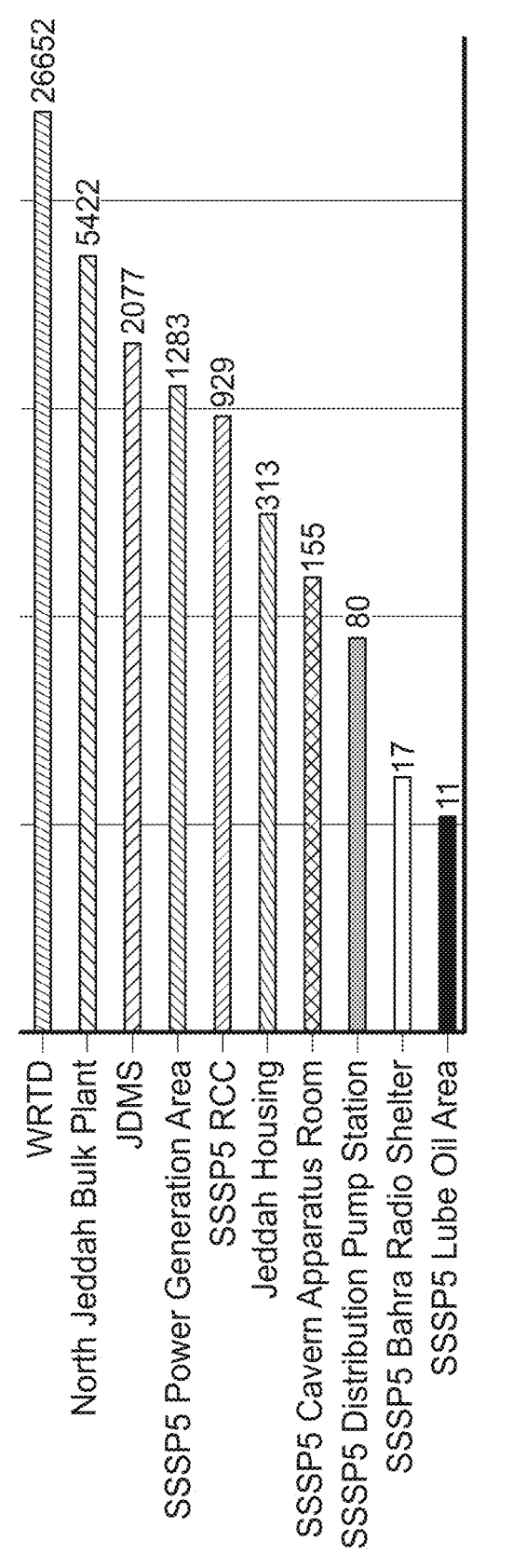
FIG. 4 is an example graph showing a number of completed calls for a given BS for a respective month.
Figure 5:
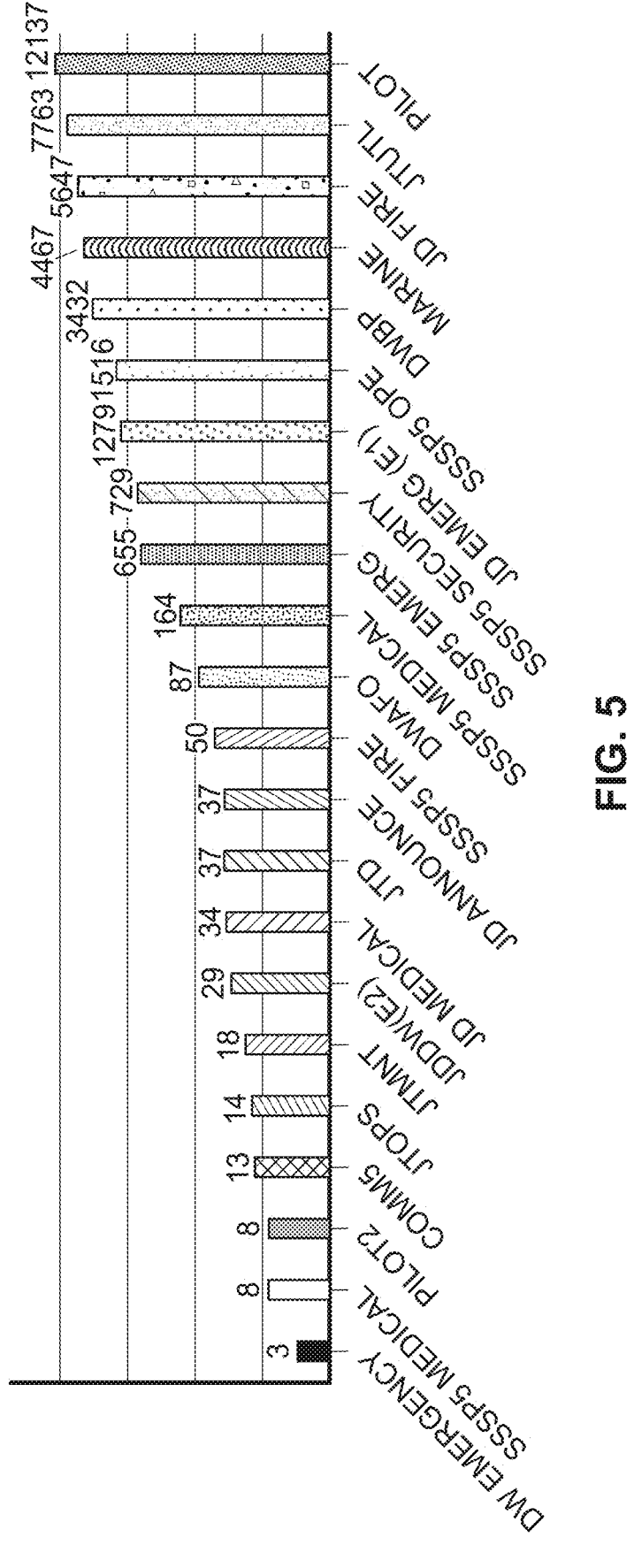
FIG. 5 is an example graph showing a number of completed calls per a group or subscriber for a respective month.
Figure 6:
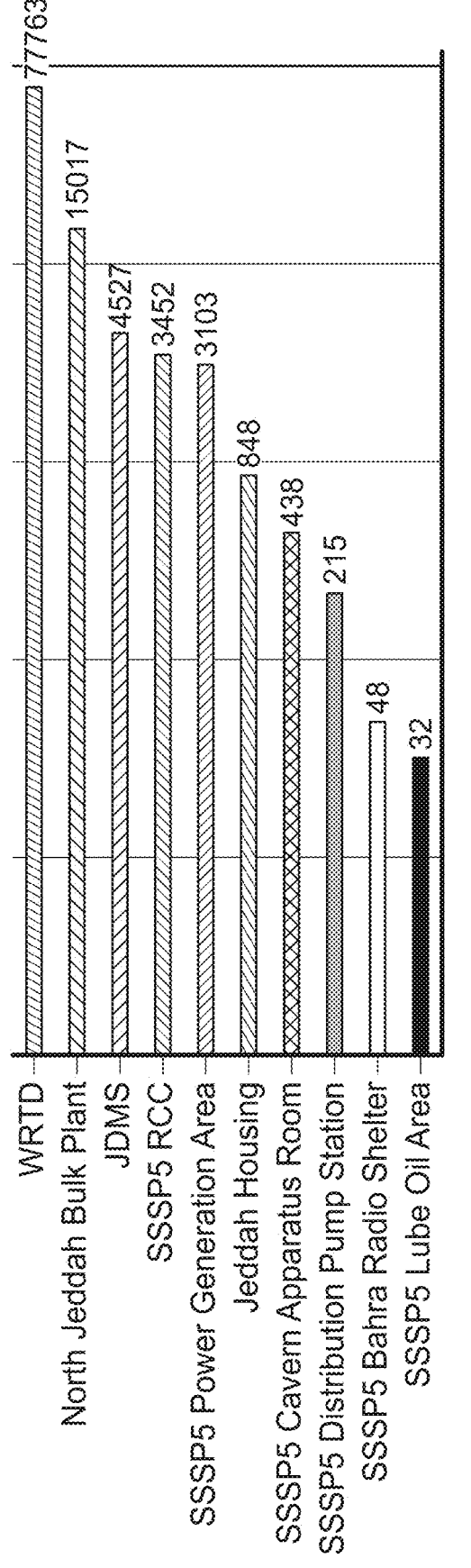
FIG. 6 is an example graph showing a duration in seconds for all calls for a given BS for a respective month.

FIG. 4 is an example graph 400 showing a number of completed radio calls for a given base station for a respective month, with attribution to the corresponding organizations. FIG. 5 is an example graph 500 showing a number of completed radio calls for a group or subscriber for the respective month. FIG. 6 is an example graph 600 showing a duration in seconds for all calls for the given base station for the respective month. Each of the graphs 400-600 can be generated by the graphical call usage visualizer 118, as shown in FIG. 1. Thus, reference can be made to the example of FIG. 1 in the example of FIGS. 4-6. For example, the graphical call usage visualizer 118 can generate the call usage display data 120 based on the call usage data 116, which can be rendered on the output device 122, as described herein, for example, to provide one of the graphs 400-600.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein.

Moreover, it is not necessary that all described actions be performed to implement the method.

FIG. 7 is an example of a method 700 for optimizing a GOS of a trunked telecommunications network (e.g., the trunked telecommunications network 200, as shown in FIG. 2). The method 700 can be implemented by the GOS optimizer 100, as shown in FIG. 1. Thus, reference be made to the example of FIGS. 1-2 in the example of FIG. 7. The method 700 can begin at 702 by receiving (e.g., at the GOS optimizer 100) call traffic data (e.g., the call traffic data 106, as shown in FIG. 1, or the call traffic data 226, as shown in FIG. 2) from a recorder system (e.g., the recorder system 108, as shown in FIG. 1, or the recorder system 224, as shown in FIG. 2). At 704, determining (e.g., using the GOS optimizer 100) a number of mobile stations (e.g., the mobile stations 202-204, as shown in FIG. 2) that have been used by users to implement a call using a given base station (e.g., the base station 208, as shown in FIG. 2) of the trunked telecommunications network based on the traffic data.

At 706, a determination is made (e.g., using the GOS optimizer 100) that the number of mobile stations is equal to or within a value or range of a base station support threshold for the given base station, which can indicate that call traffic is high for the given base station corresponding to a high probability that a given mobile station of the mobile stations will be blocked or denied access from implementing a call in a future using the given base station. At 708, a determination is made (e.g., using the GOS optimizer 100) of a number of additional channels needed for the given base station to lower a probability that one of the mobile stations will be blocked or denied access from implementing the call in the future using the given base station. At 710, (e.g., using the GOS optimizer 100) the given base station is updated to lower the probability that one of the mobile stations will be blocked or denied access from implementing the call in the future using the given base station.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 8. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 8:
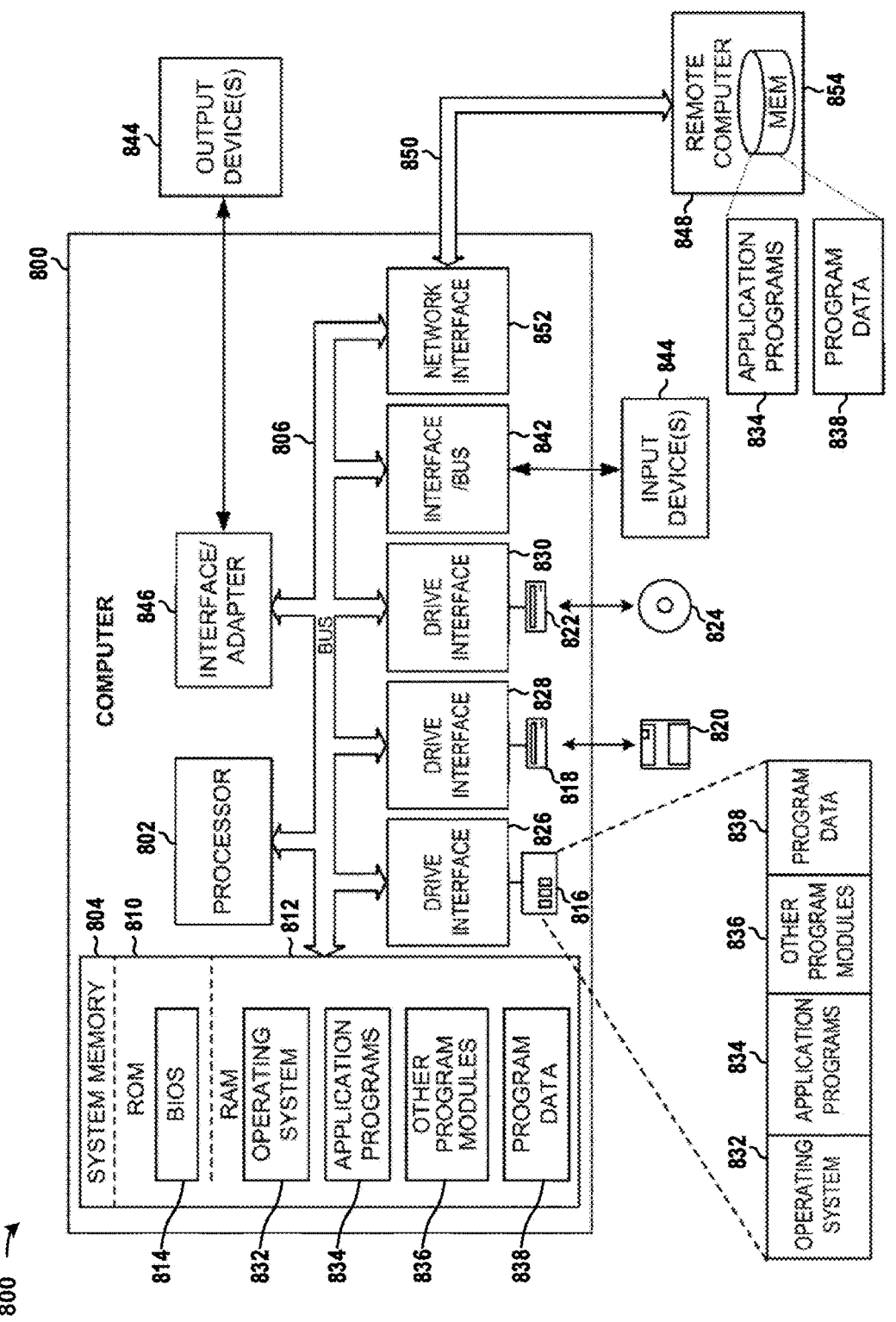
FIG. 8 depicts an example computing environment that can be used to perform methods according to an aspect of the present disclosure.

In this regard, FIG. 8 illustrates one example of a computer system 800 that can be employed to execute one or more embodiments of the present disclosure. Computer system 800 can be implemented on one or more general purpose networked computer systems, embedded computer systems, routers, switches, server devices, client devices, various intermediate devices/nodes or standalone computer systems. Additionally, computer system 800 can be implemented on various mobile clients such as, for example, a personal digital assistant (PDA), laptop computer, pager, and the like, provided it includes sufficient processing capabilities.

Computer system 800 includes processing unit 802, system memory 804, and system bus 806 that couples various system components, including the system memory 804, to processing unit 802. Dual microprocessors and other multiprocessor architectures also can be used as processing unit 802. System bus 806 may be any of several types of bus structure including a memory bus or memory controller, a peripheral bus, and a local bus using any of a variety of bus architectures. System memory 804 includes read only memory (ROM) 810 and random access memory (RAM) 812. A basic input/output system (BIOS) 814 can reside in ROM 810 containing the basic routines that help to transfer information among elements within computer system 800.

Computer system 800 can include a hard disk drive 816, magnetic disk drive 818, e.g., to read from or write to removable disk 820, and an optical disk drive 822, e.g., for reading CD-ROM disk 824 or to read from or write to other optical media. Hard disk drive 816, magnetic disk drive 818, and optical disk drive 822 are connected to system bus 806 by a hard disk drive interface 826, a magnetic disk drive interface 828, and an optical drive interface 830, respectively. The drives and associated computer-readable media provide nonvolatile storage of data, data structures, and computer-executable instructions for computer system 800. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 810, including operating system 832, one or more application programs 834, other program modules 836, and program data 838. In some examples, the application programs 834 can include the GOS optimizer 100, as shown in FIG. 1. The application programs 834 and program data 838 can include functions and methods programmed for GOS optimization of a trunked telecommunications network, such as the trunked telecommunications network 200, as shown in FIG. 2.

A user may enter commands and information into computer system 800 through one or more input devices 840, such as a pointing device (e.g., a mouse, touch screen), keyboard, microphone, joystick, game pad, scanner, and the like. These and other input devices are often connected to processing unit 802 through a corresponding port interface 842 that is coupled to the system bus, but may be connected by other interfaces, such as a parallel port, serial port, or universal serial bus (USB). One or more output devices 844 (e.g., display, a monitor, printer, projector, or other type of displaying device) is also connected to system bus 806 via interface 846, such as a video adapter.

Computer system 800 may operate in a networked environment using logical connections to one or more remote computers, such as remote computer 848. Remote computer 848 may be a workstation, computer system, router, peer device, or other common network node, and typically includes many or all the elements described relative to computer system 800. The logical connections, schematically indicated at 850, can include a local area network (LAN) and a wide area network (WAN). When used in a LAN networking environment, computer system 800 can be connected to the local network through a network interface or adapter 852. When used in a WAN networking environment, computer system 800 can include a modem, or can be connected to a communications server on the LAN. The modem, which may be internal or external, can be connected to system bus 806 via an appropriate port interface. In a networked environment, application programs 834 or program data 838 depicted relative to computer system 800, or portions thereof, may be stored in a remote memory storage device 854.

The invention claimed is:

1. A computer-implemented method, comprising:
receiving, by a grade of service (GOS) optimizer, call traffic data from a recorder system coupled to a telecommunications network;
determining, by the GOS optimizer, a number of mobile stations that have been used by users to implement a call during a period of time using a base station of the telecommunications network based on the call traffic data;
determining, by the GOS optimizer, that the number of mobile stations is equal to or within a value or range of a base station support threshold corresponding to a probability that a given mobile station of mobile stations of the number of mobile stations is, during at least one of a present time and a future time, blocked or denied access from initiating a respective call using the base station;
determining, by the GOS optimizer, a number of additional channels that are needed for the base station to reduce the probability that the given mobile station of the mobile stations is, during at least one of a present time and a future time, blocked or denied access from initiating the respective call using the base station; and
allocating, by the GOS optimizer, a number of non-active mobile stations to the base station based on the determined number of additional channels that are needed, wherein the non-active mobile stations are identified by determining a difference between a set of mobile station identifiers at the call traffic data and a second set of mobile station identifiers at a set of resource data.

2. The computer-implemented method of claim 1, further comprising causing the base station to update to reduce the probability that the given mobile station of the mobile stations is, during at least one of a present time and a future time, blocked or denied access from initiating the respective call in the future using the base station.

3. The computer-implemented method of claim 2, wherein the causing comprises outputting resource change data identifying a number of additional hardware and/or a type of additional hardware or other resources needed for implementation at the base station to support the number of additional channels corresponding to the reduced probability that the given mobile station of the mobile stations is, during at least one of a present time and a future time, blocked or denied access from initiating the respective call using the base station.

4. The computer-implemented method of claim 3, wherein the telecommunications network is a Terrestrial Trunked Radio (TETRA) network.

5. The computer-implemented method of claim 4, further comprising processing the call traffic data to determine call usage in terms of base stations, groups and/or subscribers based on the call traffic data.

6. The computer-implemented method of claim 5, further comprising generating call usage display data based on the call usage data and causing the call usage display data to render on an output device for graphical call usage visualization for the base stations, groups, and/or subscribers.

7. The computer-implemented method of claim 3, further comprising:

determining that the number of mobile stations is equal to or below a predetermined mobile station use threshold; and outputting awareness data indicating that there is a lack of knowledge on how to use mobile stations by at least some of the users of the mobile stations.

8. The computer-implemented method of claim 3, wherein the period of time is a first period of time, and the number of mobile stations is a first number of mobile stations, and each call that was initiated by the first number of mobile stations was during the first period of time, the method further comprising:

determining a second number of mobile stations that have been previously used by the users during a second period of time to initiate a given call based on the set of resource data, the second period of time occurring earlier in time before the first period of time; and identifying a subset of mobile stations of the first number of mobile stations based on a difference between the first number of mobile stations and the second number of mobile stations.

9. The computer-implemented method of claim 8, further comprising causing the subset of mobile stations to disable from being used by the users of the second number of mobile stations.

10. The computer-implemented method of claim 3, further comprising:

determining a number of times that the mobile stations were used to request service from one or more base stations of the telecommunications network during the period of time based on the call traffic data; and determining that there was a high usage of the mobile stations in response to determining that the number of times that the mobile stations were used to request service during the period of time is greater than a service request frequency threshold, wherein the high usage of the mobile stations is indicative of a need for additional or spare batteries for the mobile stations.

11. A system, comprising:

a grade of service (GOS) optimizer comprising a GOS engine;

memory coupled to the GOS optimizer, wherein the memory is configured to store machine-readable instructions and data comprising call traffic data; and

one or more processors coupled to the GOS optimizer and the memory, wherein the one or more processors is configured to access the memory and execute the machine-readable instructions, the machine-readable instructions causing:

the grade of service (GOS) engine to:

determine that there is a probability that a given mobile station of mobile stations using a base station of a communication network is, during at least one of a present time and a future time, blocked or denied access from initiating a respective call using the base station based on the call traffic data;

determine a number of additional channels that are needed for the given base station to reduce the probability that the given mobile station of the mobile stations is, during at least one of a present time and a future time, blocked or denied access from initiating the respective call using the base station; and identify a number of additional hardware and/or a type of additional hardware needed at the base station to support the number of additional channels to reduce the probability that the given mobile station of the mobile stations is, during at least one of a present time and a future time, blocked or denied access from initiating the respective call using the base station; and the GOS optimizer to:

allocate a number of non-active mobile stations to the base station based on the determined number of additional channels that are needed, wherein the non-active mobile stations are identified by determining a difference between a set of mobile station identifiers at the call traffic data and a second set of mobile station identifiers at a set of resource data.

12. The system of claim 11, wherein the GOS optimizer further comprise a call traffic analyzer programmed to process the call traffic data to provide call usage data for base stations, groups and/or subscribers, wherein the call traffic data is provided by a recorder system coupled to the telecommunications network.

13. The system of claim 12, wherein the GOS optimizer further comprise a graphical call usage visualizer programmed to output call usage display data based on the call usage data and cause the call usage display data to render on an output device for graphical call usage visualization for the base stations, groups, and/or subscribers.

14. The system of claim 13, wherein the machine-readable instructions further causes the GOS engine to:

determine a number of times that the mobile stations were used to request service from one or more base stations of the telecommunications network during a period of time based on the call traffic data; and determine that there was a high usage of the mobile stations in response to determining that the number of times that the mobile stations were used to request service during the period of time is greater than a service request frequency threshold, wherein the high usage of the mobile stations is indicative of a need for additional or spare batteries for the mobile stations.

15. The computer-implemented method of claim 11, wherein the trunked telecommunications network is a Terrestrial Trunked Radio (TETRA) network.

* * * * *